(12) United States Patent
Dooley

(10) Patent No.: US 10,167,784 B2
(45) Date of Patent: Jan. 1, 2019

(54) SYSTEM FOR DETECTING SHAFT SHEAR EVENT

(71) Applicant: Pratt & Whitney Canada Corp., Longueuil (CA)

(72) Inventor: Kevin Allan Dooley, Toronto (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 13/661,436

(22) Filed: Oct. 26, 2012

(65) Prior Publication Data

US 2014/0121934 A1    May 1, 2014

(51) Int. Cl.
*F02C 9/46* (2006.01)
*F01D 21/06* (2006.01)

(52) U.S. Cl.
CPC ............... *F02C 9/46* (2013.01); *F01D 21/06* (2013.01)

(58) Field of Classification Search
None
See application file for complete search history.

(56) References Cited

U.S. PATENT DOCUMENTS

| | | | |
|---|---|---|---|
| 3,394,581 A | 6/1968 | Johnson | |
| 3,641,550 A | 2/1972 | Lynas et al. | |
| 3,852,958 A | 12/1974 | Adams et al. | |
| 4,162,491 A | 7/1979 | Gochis | |
| 4,271,799 A * | 6/1981 | Kato et al. | 123/406.38 |
| 4,387,588 A * | 6/1983 | Kaji | 73/35.05 |
| 4,545,198 A | 12/1985 | Yoshida | |
| 4,591,794 A | 5/1986 | Shattuck et al. | |
| 4,620,446 A | 11/1986 | Jensen et al. | |
| 4,712,372 A | 12/1987 | Dickey et al. | |
| 4,737,709 A | 4/1988 | Loftus | |
| 4,833,405 A | 5/1989 | Richards et al. | |
| 5,411,364 A | 5/1995 | Aberg et al. | |
| 6,067,956 A * | 5/2000 | Motose et al. | 123/305 |
| 6,176,074 B1 | 1/2001 | Thompson et al. | |
| 6,293,085 B2 * | 9/2001 | Thompson | F01D 21/045 60/39.281 |
| 6,708,722 B1 * | 3/2004 | Goodenough | 137/487.5 |
| 6,756,908 B2 | 6/2004 | Gass et al. | |
| 7,002,172 B2 | 2/2006 | Rensch | |
| 7,100,354 B2 | 9/2006 | Opper | |
| 7,392,713 B2 | 7/2008 | Barkhoudarian | |
| 7,443,642 B2 | 10/2008 | Dooley | |

(Continued)

FOREIGN PATENT DOCUMENTS

| CA | 1103309 | | 6/1981 |
|---|---|---|---|
| WO | WO 9714025 | * | 4/1997 |

OTHER PUBLICATIONS

Canadian Intellectual Property Office; Examiner's Requisition dated Mar. 26, 2012.

(Continued)

*Primary Examiner* — Navid Ziaeianmehdizadeh
(74) *Attorney, Agent, or Firm* — Norton Rose Fulbright Canada LLP

(57) ABSTRACT

Systems and methods for detecting a shaft shear event in a turbine engine. An accelerometer coupled to the engine detects an axial acceleration indicative of a shaft shear event in the engine. A control system is configured to, in response to the detected axial acceleration, transmit a signal to initiate a shut down of a fuel system of the engine.

7 Claims, 2 Drawing Sheets

(56) References Cited

U.S. PATENT DOCUMENTS

| | | | |
|---|---|---|---|
| 7,758,301 B2 | 7/2010 | Bilson et al. | |
| 2003/0091430 A1* | 5/2003 | Mulera et al. | 415/14 |
| 2005/0187685 A1* | 8/2005 | Kondo | B60R 21/013 |
| | | | 701/45 |
| 2007/0241921 A1 | 10/2007 | Arguello et al. | |
| 2009/0266160 A1* | 10/2009 | Jeffrey | G01H 1/006 |
| | | | 73/455 |
| 2010/0219987 A1 | 9/2010 | Isom et al. | |
| 2011/0213537 A1 | 9/2011 | Dooley | |
| 2011/0307163 A1* | 12/2011 | Kato et al. | 701/104 |
| 2012/0210694 A1* | 8/2012 | Holmquist | 60/39.091 |
| 2012/0325321 A1* | 12/2012 | Perry et al. | 137/1 |
| 2013/0294947 A1* | 11/2013 | Schlienger et al. | 417/407 |
| 2014/0324365 A1* | 10/2014 | Orman et al. | 702/39 |

OTHER PUBLICATIONS

Canadian Intellectual Property Office; Response to Examiner's Requisition dated Mar. 26, 2012.

\* cited by examiner

SYSTEM FOR DETECTING SHAFT SHEAR EVENT

TECHNICAL FIELD

The disclosure relates generally to systems for detection of shaft shear events, in particular in turbine engines.

BACKGROUND OF THE ART

Shearing of the engine shaft is a failure event in a turbine engine that should be detected as quickly as possible. Conventional systems typically use speed changes of the rotor system or an axially triggered mechanical device to detect a shaft shear event. However, such methods have drawbacks, such as typically requiring a significant amount of time to detect the shaft shear event.

SUMMARY

The disclosure describes electric machines, and in particular systems, devices, and processes for detecting a shaft shear event, particularly in engines such as aircraft turbine engines.

In various aspects and example embodiments, the present disclosure provides a system for detecting a shaft shear event in a turbine engine, the system may include: an accelerometer coupled to the engine for detecting an axial acceleration indicative of a shaft shear event in the engine; and a control system configured to, in response to the detected axial acceleration, transmit a signal to initiate a shut down of a fuel system of the engine.

In various aspects and example embodiments, the present disclosure provides a method of detecting a shaft shear event in a turbine engine, the method being implemented in a control system controlling a fuel shutoff mechanism of the engine, the method may include: receiving a signal representing a detection of axial acceleration of the engine that is indicative of the shaft shear event; and transmitting a signal to initiate a shut down of a fuel system of the engine.

Further details of these and other aspects of the subject matter of this application will be apparent from the detailed description and drawings included below.

DESCRIPTION OF THE DRAWINGS

Reference is now made to the accompanying drawings, in which.

DETAILED DESCRIPTION

Aspects of various embodiments are described through reference to the drawings.

In various aspects and example embodiments, the present disclosure may provide systems for detecting an engine shaft shear event in a relatively short time, in a relatively reliable and/or predictable way.

Figure 1:
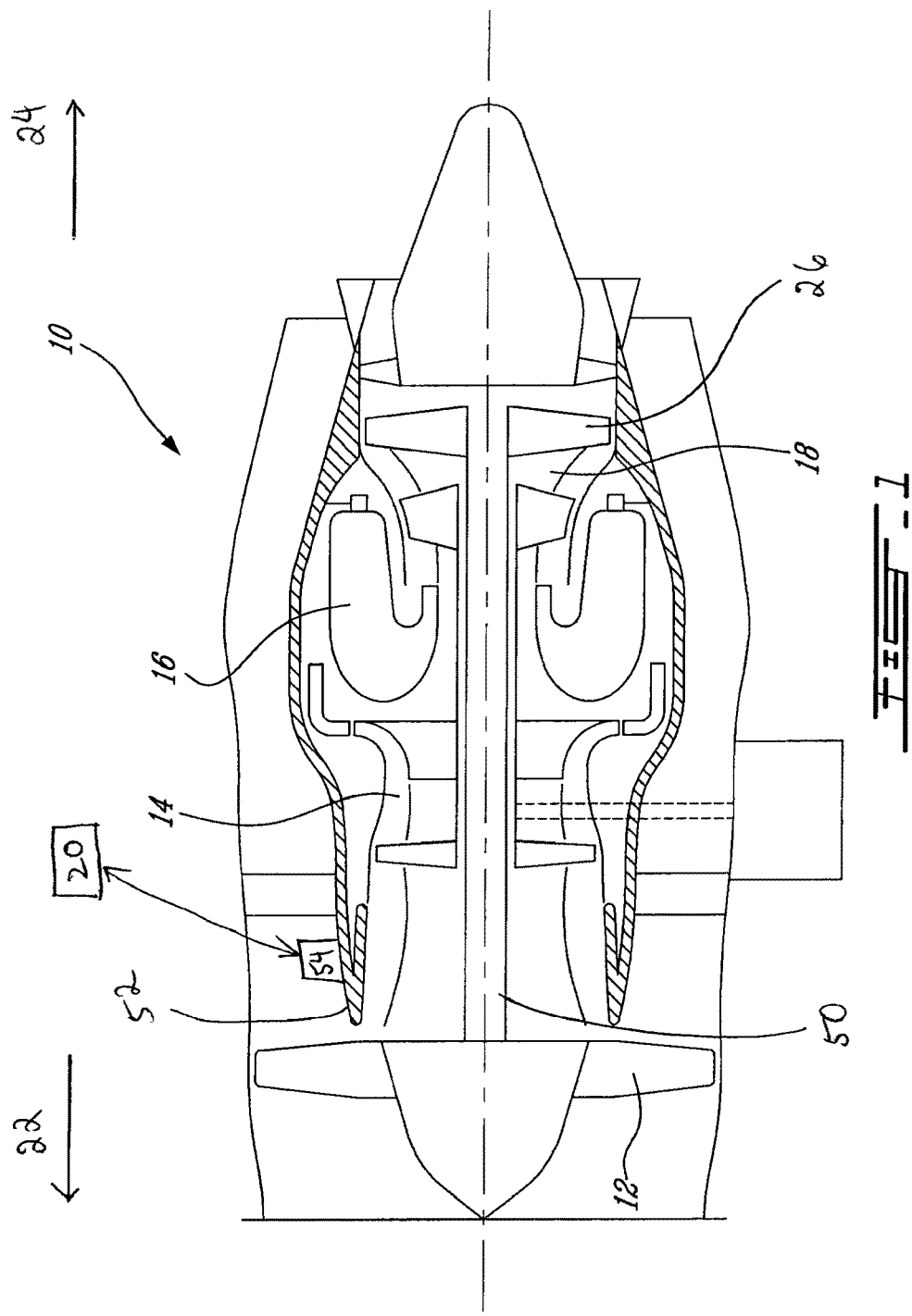
FIG. 1 shows an axial cross-section view of a turbo-fan gas turbine engine.

FIG. 1 illustrates an axial cross-section of a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18, including a turbine 26, for extracting energy from the combustion gases. The engine 10 may generally define a front or forward direction 22, towards the fan 12 and away from the turbine section 18; and a rear or rearward direction 24, towards the turbine section 18 and away from the fan 12. The forward direction 22 may be the typical direction of movement of the engine 10 when in use. The engine 10 typically includes at least one shaft 50 for transmitting torque from one component (e.g., the turbine 26) to at least one other component (e.g., the fan 12) of the engine 10. The longitudinal axis of the shaft 50 may define an axial axis of the engine 10.

The shaft 50 may shear or otherwise break, for example due to fatigue or wear. This may be referred to as a shaft shear event, and is typically considered a critical event that requires immediate shut down of the engine 10, to prevent further damage to the engine 10 and/or the aircraft (e.g., to prevent over-speeding of the turbine and resulting potential turbine burst). When an engine shaft shear event occurs, there is typically a characteristic spike in axial acceleration of the engine carcass (e.g., including the engine casing 52). For example, when a shaft shear event occurs, the low spool turbine assembly (e.g., including the turbine section 18) typically accelerates axially rearwards at a very high acceleration rate (e.g., in the range of 25-250 g), which would result in a predictable reaction acceleration in the forward direction of the engine carcass. The change in axial acceleration due to a shaft shear event can be predicted using calculations based on the mass and components of a given engine 10.

In the present disclosure, an accelerometer 54 (e.g., an impact-type or crash-sensing accelerometer, which may be similar to those used in automobiles for airbag deployment) may be used to detect axial acceleration of the engine carcass, in order to detect axial acceleration that may be indicative of a shaft shear event. Because the intermediate engine casing 52 typically readily transmits axial accelerations of the engine carcass and typically provides an environment (e.g., temperature and humidity levels) that is friendly to sensors such as accelerometers, the accelerometer 54 may be coupled (e.g., mounted on) the intermediate engine casing 52.

Any other location on the engine 10 that would be susceptible to a large axial acceleration (in particular susceptible to a large axial acceleration exclusively as a result of a shaft shear event) may also be used for mounting the accelerometer 54.

For example, the accelerometer 54 may also be located inside a housing of a control device 20, such as the electronic engine controller (EEC) housing or the full authority digital engine control (FADEC) housing. Since the accelerometer 54 may communicate with the control device 20 (as described further below), such a location may be useful to reduce or avoid the use of wiring and/or connectors, to allow the accelerometer 54 to have direct access to the fuel control system (which is typically implemented by the control device 20) and/or to allow the accelerometer 54 to have access to electrical power. The control device 20 may be located in an appropriate location that is susceptible to axial acceleration resulting from a shaft shear event, such that axial acceleration may be transmitted to and detected by the accelerometer 54. Such a location of the control device 20 may be conveniently at or near the typical mounting location of control devices. Axial vibrations of the engine 10 may be typically much lower than in other directions (e.g., radial or tangential), such that transmission of axial vibrations to the control device 20 may not impact reliability and/or function of the control device 20.

The accelerometer 54 may be positioned and/or configured such that the accelerometer 54 is sensitive only to substantially axial accelerations.

An example of a suitable accelerometer 54 may be analog device ADXL150, or any other impact-type accelerometer having a suitably fast response. The accelerometer 54 may be configured to send a signal (e.g., a pulse signal) when the accelerometer 54 detects an impact-type acceleration that exceeds a preset threshold. The accelerometer 54 may be configured to send a signal detectable by one or more control devices 20, such as an electronic engine control.

In various embodiments, control device(s) 20 may include or form part of a FADEC which may, for example, comprise one or more digital computer(s) or other data processors, sometimes referred to as EEC(s) and related accessories that control at least some aspects of performance of engine 10. Control device(s) 20 may for example be configured to make decisions regarding the control of engine 10 until a pilot wishes to or is required to intervene. Control device(s) 20 may be configured to provide optimum engine efficiency for a given flight condition. As data processors, control device(s) 20 may include one or more microcontroller or other suitably programmed or programmable logic circuits.

Control device(s) 20 may comprise memory(ies) and memory data devices or register(s). Memory(ies) may comprise any storage means (e.g. devices) suitable for retrievably storing data and/or machine-readable instructions executable by processor(s). Memory(ies) may be non-volatile. For example, memory(ies) may include erasable programmable read only memory (EPROM), flash memory(ies) or other electromagnetic media suitable for storing electronic data signals in volatile or non-volatile, non-transient form.

The accelerometer 54 may be immediately, or nearly immediately (e.g., within about 0.5 ms or less of the shaft shear event), axially accelerated (e.g., in the forward direction) at the time of shaft shear, as the turbine 26 (and any related sheared shaft components) begin its motion in the rearward direction and as it is axially arrested in its rearward acceleration. This sudden "jerk" may have a predictable axial acceleration force (e.g., based on pre-calculations using the known specifications of the engine 10), for example at least on the order of about 50 g or greater, on the engine casing 52, which may be detectable immediately or nearly immediately (e.g., within about 0.5 ms or less of the shaft shear event) by the accelerometer 54. The accelerometer 54 may be configured to generate a signal to the control device(s) 20 when the accelerometer 54 detects an axial acceleration greater than a preset threshold (e.g., on the order of magnitude of about 50 g), where the threshold may be set to be near, at, or higher than a predicted axial acceleration indicative of a shaft shear event. The signal from the accelerometer 54 may be detected by the control device(s) 20, which in turn may generate an interrupt signal to initiate a shutdown of the fuel system in response to the engine shaft shear event.

In normal operation, the engine 10 typically does not experience large axial accelerations, therefore false positive detection of a shaft shear event is unlikely to be generated by the accelerometer 54. Although the engine 10 may experience some axial vibrations, such vibrations typically are not nearly as large as the axial acceleration caused by a shaft shear event. Even other unusual engine events, such as engine surge or large bird ingestion, typically do not result in axial acceleration of the engine 10 on the order of magnitude of that caused by a shaft shear event. Since the amount of axial acceleration of the engine 10 (and the engine casing 52) may be pre-calculated based on the engine specifications, the accelerometer 54 may be pre-configured to generate a positive signal only when an axial acceleration greater than a preset threshold is detected, where the threshold may be preset to be greater than the acceleration due to other engine events (e.g., including typical as well as unusual engine events) but below the acceleration caused by a shaft shear event.

In some examples, the accelerometer 54 may be configured to be sensitive only to a large rearward or forward acceleration of the engine 10 but not both (i.e., the accelerometer 54 may be configured to be sensitive to a large detected only forward or only rearward acceleration), in order to distinguish over an engine surge event or a large bird strike event. The accelerometer 54 may also be configured to be directionally sensitive, such that only substantially axial accelerations are detected. For example, the accelerometer 54 may be positioned and/or configured such that the accelerometer 54 is unable to detect or is not responsive to substantially lateral and/or tangential accelerations.

In some examples, the accelerometer 54 and/or the control device(s) 20 may be configured to determine whether a sensed event is a false negative. For example, accelerometer 54 and/or the control device(s) 20 may be configured to determine a shaft shear event has occurred only in the case of a forward acceleration of the engine 10 followed by a rearward acceleration of the engine 10 after a predefined time period (e.g., after about on the order of 5-50 ms). Detected accelerations that do not meet this acceleration profile may be discarded as a false negative and not indicative of a shaft shear event.

In some examples, more than one accelerometer 54 may be used for detection of axial accelerations indicative of a shaft shear event. For example, two or more accelerometers 54 may be coupled (e.g., mounted) on the engine casing 52 and/or inside the control device housing. Alternatively or in addition, the accelerometer(s) 54 may be mounted on any other suitable position on the engine 10 that is susceptible to axial acceleration due to a shaft shear event. Where there are multiple accelerometers 54, the control device(s) 20 may receive signals representing an axial acceleration indicative of a shaft shear event from each accelerometer 54, and the control device(s) 20 may verify that there is sufficient agreement among the accelerometers 54 (e.g., signals from at least two or a majority of the accelerometers 54 indicate an axial acceleration indicative of a shaft shear event) in order to determine that a shaft shear event has occurred. The use of multiple accelerometers 54, whether mounted on the same or different components of the engine 10, may help reduce or avoid errors due to noise and/or accelerometer failure, for example.

In some examples, one or more of the accelerometer(s) 54 may be combined with one or more other sensors, for example in a combination sensor. In some examples, one or more of the accelerometer(s) 54 may serve to sense acceleration in combination with pressure, for example, to help improve event detection accuracy.

Figure 2:
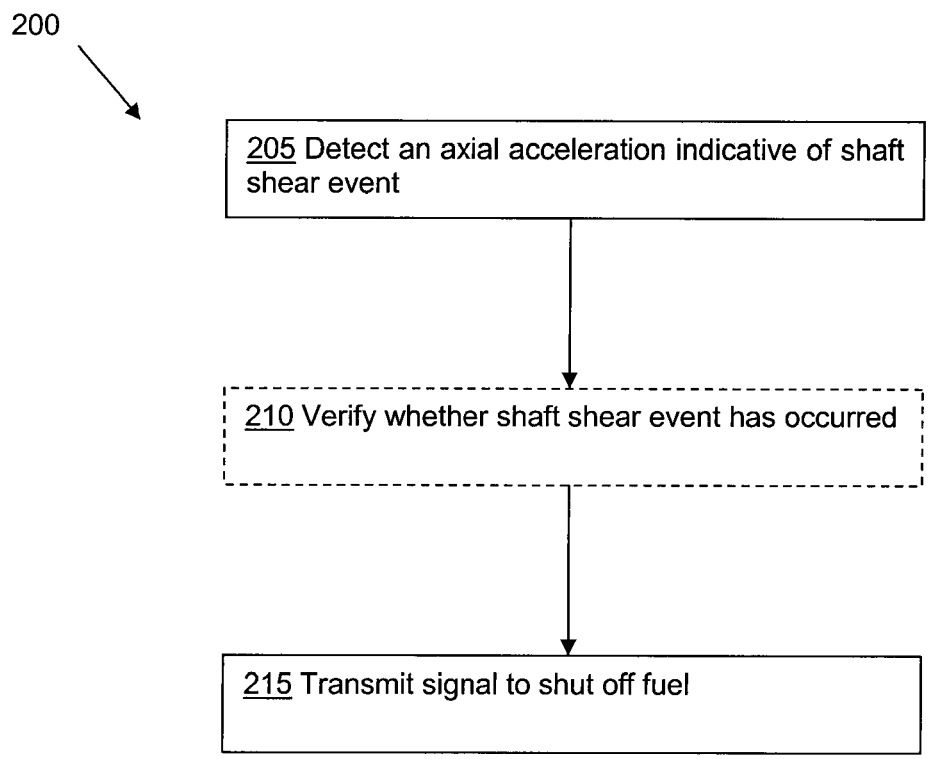
FIG. 2 shows a flowchart illustrating an example method for detecting a shaft shear event.

FIG. 2 illustrates an example method 200 for detecting a shaft shear event in an engine 10. The method 200 may be carried out by one or more control devices 20 of the engine 10, such as an electronic engine control. In some examples, the method 200 may be carried out without involvement of any control devices 20. For example, the accelerometer(s)

54 may include components (e.g., a switch such as a solid state switch, and/or a threshold detection system) to enable the accelerometer(s) 54 to carry out some or all functions described in the method 200.

At 205, an axial acceleration indicative of a shaft shear event may be detected. For example, this may be detected by the accelerometer(s) 54, and may be based on the accelerometer(s) 54 sensing an axial acceleration that exceeds a preset threshold (e.g., according to a threshold detection system within the accelerometer(s) 54). The accelerometer(s) 54 may transmit a signal to the control device(s) 20 representing a detection of axial acceleration indicative of a shaft shear event in the engine 10. Alternatively, the control device(s) 20 may not be involved and no signal may be transmitted from the accelerometer(s) 54 to the control device(s) 20.

Optionally, at 210, a verification may be made (e.g., by the control device(s) 20) whether a shaft shear event has occurred. For example, where more than one accelerometer 54 is configured to detect axial acceleration indicative of a shaft shear event and to transmit such signals to the control device(s) 20, the control device(s) 20 may determined whether positive signals have been received from a sufficient number of accelerometers 54 (e.g., at least two or at least a majority). If so, the control device(s) 20 may verify that a shaft shear event has occurred and the method 200 may proceed to 215. Otherwise, the signal(s) received at 205 may be ignored and/or the control device(s) 20 may generate a signal indicating that one or more accelerometers 54 have malfunctioned. The control device(s) 20 may compare the received acceleration signals to the expected acceleration profile for a shaft shear event (e.g., a forward acceleration of the engine 10 followed by a rearward acceleration of the engine 10 after a predefined time period (e.g., after about on the order of 5-50 ms)).

In some examples, 210 may be carried out without involvement of the control device(s) 20. For example, 210 may be carried out by the accelerometer(s) 54, such as where the accelerometer(s) 54 has processing capability for carrying out comparisons with an expected acceleration profile.

At 215, in response to the detected axial acceleration indicative of the shaft shear event, a signal may be transmitted to a fuel supply to cause a shut off of fuel to the engine 10. For example, the control device(s) 20 may transmit such a signal. In some examples, such a signal may be transmitted by a solid state switch internal or external to the accelerometer(s) 54 to a fuel shutoff mechanism. The solid state switch may be directly connected to the fuel shutoff mechanism. Examples of fuel shutoff mechanisms may include a fast-acting solenoid or a pyrotechnic fuel shutoff valve device (e.g., as described in U.S. Pat. No. 7,536,850, the entirety of which is hereby incorporated by reference), among others.

In some examples, the control device(s) 20 may store data (e.g., in one or more memories coupled to the control device(s) 20) related to the shaft shear event, such as the magnitude of detected acceleration or the time of detected shaft shear. Such data may be used for later analysis and/or for liability or auditing purposes, for example.

The method 200 may then end.

The method 200 may also include, at the start, presetting the detection threshold for one or more of the accelerometer(s) 54, as well as resetting one or more of the accelerometer(s) 54 (e.g., after a false positive has been detected).

The present disclosure may provide one or more advantages not available with conventional shaft shear detection systems.

For example, the use of an electronic system (including electronic accelerometer(s) 54) rather than a mechanical system may allow for relatively simple and/or quick resetting of the system (e.g., in the case of a false positive). When a mechanical system is erroneously set off, it is typically necessary to open the engine 10 and manually reset the mechanical components to their original positions. This is typically time-consuming, expensive and tedious. This also typically renders the engine 10 unavailable for use until the manual reset has been completed. Using the system of the present disclosure, a reset may be performed electronically, for example by transmitting appropriate instructions to the control device(s) 20, which may be faster, easier and less expensive.

The use of an electronic system may also allow for collection of forensic data (e.g., collected from data stored by the control device(s) 20) that may be used for post-failure analysis.

The present disclosure may allow for faster detection of a shaft shear event than conventional systems. For example, conventional systems that rely on a detection of rate of change of speed may require a length of time in order to measure a rate of change of speed. This length of time may introduce a delay in the required action, which may be undesirable since it is considered critical to shutoff fuel to the engine 10 immediately or nearly immediately once a shaft shear event occurs, to avoid further engine damage.

The present disclosure may provide a relatively simple and lightweight system for detection of a shaft shear event. A relatively simple and/or lightweight system may be desirable where the engine 10 is an aircraft engine 10, where weight may be a concern. The present disclosure may also be implemented using off-the-shelf components (e.g., off-the-shelf impact-type accelerometers), which may be simpler and/or more cost-effective than conventional systems.

Because the axial acceleration response to a shaft shear event may be pre-calculated with relatively good accuracy, using known characteristics of the engine 10 (e.g., engine mass and/or components), the sensitivity of the accelerometer(s) 54 may be appropriately set, to avoid false negatives and/or false positives. Further, the sensitivity may be adjusted (e.g., by programming the accelerometer(s) 54 with different preset threshold values) as needed, relatively quickly and easily. In conventional systems, such dynamic adjustment of sensitivity may not be possible or may be complex and/or difficult. Conventional systems, such as those based on detection of rate of change of speed, may be susceptible to false positives, such as caused by engine surges.

The above description is meant to be exemplary only, and one skilled in the art will recognize that changes may be made to the embodiments described without departing from the scope of the invention disclosed. For example, one or more steps of the method 100 may be omitted and/or performed in an order different from that illustrated. The present disclosure may be implemented in engines other than that described. For example, although a turbofan engine has been described, the present disclosure may be implemented in a turboshaft engine, or any other suitable aircraft engine. Also disclosed are computer program products (e.g., memories and other storage media) storing instructions thereon to carry out aspects of the present disclosure. Still other modifications which fall within the scope of the present invention will be apparent to those skilled in the art, in light of a review of this disclosure, and such modifications are intended to fall within the appended claims.

The invention claimed is:

1. A method of detecting a break of a turbine-driven shaft of a gas turbine engine during operation of the gas turbine engine, the method comprising:
    detecting a first axial acceleration of a component of the gas turbine engine other than the turbine-driven shaft, the first axial acceleration having a magnitude equal to or exceeding a preset threshold and a first direction along a longitudinal axis of the turbine-driven shaft;
    after detecting the first axial acceleration of the component, detecting a second axial acceleration of the component, the second axial acceleration having a second direction along the longitudinal axis of the turbine-driven shaft and opposite the first direction; and
    initiating a shutdown of the gas turbine engine after detecting the second axial acceleration.

2. The method as defined in claim 1, wherein the preset threshold for the first axial acceleration is 50 g.

3. The method as defined in claim 1, wherein the gas turbine engine is an aircraft engine and the first axial direction is a forward direction of movement of the gas turbine engine on an aircraft.

4. The method as defined in claim 1, comprising detecting the second axial acceleration within a predefined time period of the first axial acceleration, the predefined time period being between 5 and 50 ms.

5. The method as defined in claim 1, wherein the component of the gas turbine engine is a casing of the gas turbine engine.

6. The method as defined in claim 1, wherein the component of the gas turbine engine is a carcass of the gas turbine engine.

7. The method as defined in claim 1, wherein the component of the gas turbine engine is a housing of a controller of the gas turbine engine.

* * * * *